United States Patent

Schaefer et al.

[15] 3,664,895

[45] May 23, 1972

[54] METHOD OF FORMING A CAMERA TUBE DIODE ARRAY TARGET BY MASKING AND DIFFUSION

[72] Inventors: Donald L. Schaefer; Ronald H. Wilson, both of Schenectady, N.Y.

[73] Assignee: General Electric Company

[22] Filed: June 13, 1969

[21] Appl. No.: 833,111

[52] U.S. Cl. ....................148/187

[51] Int. Cl. ....................H01l 7/44

[58] Field of Search ....................148/1.5, 186, 187, 188; 25/572; 204/172; 117/201, 93.3; 317/235

[56] References Cited

UNITED STATES PATENTS

| | | | |
|---|---|---|---|
| 3,287,243 | 1/1966 | Ligenza | 204/192 |
| 3,419,746 | 12/1968 | Crowell et al. | 317/235 |
| 3,473,959 | 10/1969 | Ehinger et al. | 204/192 |
| 3,484,358 | 12/1969 | Androshuk et al. | 204/192 |
| 3,485,739 | 12/1969 | Toombs | 204/192 |
| 3,506,556 | 4/1970 | Gillery et al. | 204/192 |

OTHER PUBLICATIONS

Davidse, W. A. Theory and Practice of RF Sputtering, In Vacuum, 17(3) p. 139-145

*Primary Examiner*—Hyland Bizot
*Attorney*—Richard R. Brainard, Paul A. Frank, John J. Kissane, Frank L. Neuhauser and Joseph B. Forman

[57] ABSTRACT

Silicon diode array vidicon targets characterized by a silicon oxide insulator disposed between P-type conductivity regions forming discrete diodes within an N-type conductivity wafer have been made substantially immune to burn-in by the utilization of a 0,1 to 3 micron thick electrically conducting glass layer to leak charge formed on the insulator to the adjacent P-type conductivity regions of the target. Preferably the electronically conducting glass is an alkaline earth metal borate glass containing an oxide of a metal, e.g., iron, vanadium, cobalt, etc., providing ions of both a higher valence state and a lower valence state within the glass to permit regulation of the resistivity of the glass layer during fabrication of the bulk glass. To inhibit crazing of the glass layer while providing superior contact between the glass and the surface of the target, the glass layer is R.F. sputter deposited atop the target employing a sputtering atmosphere, e.g., argon, nitrogen, oxygen, selected to provide the desired resistivity in the deposited glass layer.

6 Claims, 4 Drawing Figures

Figure 1:
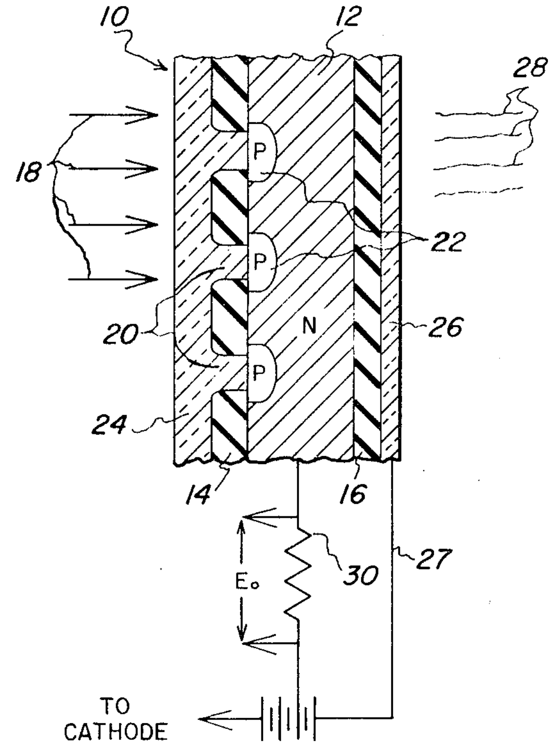

INVENTORS:
DONALD L. SCHAEFER;
RONALD H. WILSON
by John J. Kissane
THEIR ATTORNEY INVENTORS:
DONALD L. SCHAEFER;
RONALD H. WILSON
by John J. Kissane
THEIR ATTORNEY

METHOD OF FORMING A CAMERA TUBE DIODE ARRAY TARGET BY MASKING AND DIFFUSION

This invention relates to burn-in free diode array vidicon targets having an electronically conducting glass layer to leak charge from the insulating layer discretely shielding the diode array substrate from the scanning electron beam and to a method of forming the target by deposition of a 0.1–3 micron thick layer of the conductive glass atop the target to inhibit crazing of the deposited glass layer.

Silicon diode array vidicon targets characteristically are formed from a wafer of N-type conductivity silicon having a multitude of P-type conductivity regions diffused partially therein through small apertures etched in an insulator overlying one face of the wafer. When an electron beam subsequently is scanned across the wafer face overlaid by the apertured insulator, the individual diodes formed by the P-type conductivity regions in the wafer are reverse biased by the beam and, in the absence of photons impinging on the opposite face of the target to produce hole-electron pairs, the diodes remain in a substantially reverse biased condition until the electron beam again scans the diode. At target locations whereat impinging photons effect a discharge of the diodes, a greater electron charge must be deposited by the beam to again reverse bias the diode and an output video signal is obtained by measuring current flow in the silicon wafer resulting from the electron beam deposited charge.

When the scanned electron beam is of a diameter to simultaneously encompass a plurality of diodes, e.g., to minimize the presence of an inoperative diode in the target by redundancy or when the electron beam is scanned over the insulated areas between the diodes, charge tends to collect on the apertured insulator resulting in the formation of a field induced channel below the insulator degrading the isolation between the P-type conductivity regions of adjacent diodes. One technique heretofore employed to inhibit charge build-up on the apertured insulator has been the deposition of a metal, e.g., gold, atop both the P-type conductivity regions of the diodes and a portion of the adjacent insulator to conduct electron beam induced charge from the insulator to the P-type conductivity region of the target. The metal deposition technique however requires precise registration between the deposited metal dots and the underlying P-type conductivity regions of the target to inhibit shorting of adjacent diodes. Because of the registration problems associated with charge drain by a metallic conductor overlying each P-type conductivity region of the target, it has been proposed, e.g., in U.S. Pat. No. 3,419,746, that a semiconductive insulating layer having a discharge time constant greater than the period of the scanning electron beam and less than the relaxation time of the apertured insulator be deposited over the entire electron beam bombarded surface of the target to leak charge from the insulator to the P-type conductivity regions of the target without shorting adjacent diodes. Among the materials suggested as being suitable for this purpose are silicon monoxide, antimony trisulfide, cadmium sulfide, zinc sulfide, arsenic trisulfide, antimony trisulfide, arsenic triselenide, nickel oxide, titanium oxide, and mixtures of the foregoing as well as coevaporated films of silicon dioxide and gold. The suggested unitary compound materials however characteristically are of a fixed resistivity negating wide flexibility in such design criteria as the required thickness of the semiconductive insulating layer to discharge the underlying apertured insulator within the required time period. Moreover many of the heretofore proposed semiconductive insulating layer materials, e.g., antimony trisulfide, lack stability under electron beam scanning and are subject to "burn-in", i.e., image retention greater than 5 percent after an elapsed time of three frames. Thus if the scanned area of the target is increased to enlarge the picture scope, the previously scanned center region of the diode array target produces an output signal differing from the surrounding previously unscanned border for light impingement of a given intensity thereby producing a border in the displayed image. Similarly, bakeout of the target at temperatures substantially above 200° C often has been found to adversely affect the operative characteristics of prior art diode array targets.

It is therefore an object of this invention to provide a diode array target having high stability under electron beam scanning.

It is also an object of this invention to provide a diode array target wherein the resistivity of the semiconductive insulating layer can be controlled over a wide range thereby providing greater flexibility in the design parameters of the target.

It is a further object of this invention to provide a diode array target susceptable to bakeout at temperatures between 100° C and 400° C in vacuum to enhance the operative lifetime of the target.

It is also an object of this invention to provide a novel method of fabricating an electron beam stable diode array target.

It is a still further object of this invention to provide a method of fabricating a diode array target wherein the resistivity of the semiconductive insulating layer can be altered without an alteration in the source material employed to form the semiconductive insulating layer.

These and other objects of this invention generally are achieved by diode array camera tube targets having a continuous layer of an electronically conductive glass overlying the apertured insulator to leak charge from the insulator to the selectively doped regions of the semiconductive wafer forming the target. Thus a camera tube target in accordance with this invention generally includes a semiconductive wafer of first conductivity type having a multitude of regions of second conductivity type extending through one face of the wafer to form a multitude of diodes within the wafer. Suitable insulating means extend between adjacent second conductivity type regions and overlie the first conductivity type regions of the wafer surface to shield the first conductivity regions from impingement by an electron beam scanned across the target to reverse bias the individual diodes formed in the target. To inhibit charge build-up on the insulating means tending to degrade the isolation between adjacent diodes, a 0.1–3 micron thick continuous layer of an electronically conductive glass having a discharge time constant greater than the period of the scanning beam and less than the relaxation time of the insulating means overlies both the insulating means and the exposed second conductivity type regions of the target. Desirably the electronically conductive glass is characterized by a room temperature resistivity between $10^9$ and $10^{12}$ ohm-cm with alkaline earth metal borate glasses containing at least 15 mole percent of a metal oxide providing metal ions of a higher valence state and a lower valence state in the ratio of from equal parts to four parts to one part being highly suitable for utilization in this invention.

To form a diode array camera tube target having a glass layer immune to crazing, the glass is put down by vacuum deposition techniques, e.g., preferably R.F. sputtering in a gaseous pressure between 1 and 100 microns. Thus the camera tube target is initially fabricated in conventional fashion by preparing a silicon substrate of a first conductivity type and forming an insulating layer atop one face of the substrate, e.g., by thermal oxidation, whereupon the insulator is etched to provide a plurality of apertures through which apertures a suitable impurity is diffused to form regions of a second conductivity type extending partially into the substrate. The substrate then is disposed within a suitable deposition chamber and a layer of electronically conductive glass having a room temperature resistivity between $10^8$ and $10^{16}$ ohm-cm is deposited over the apertured insulator to electrically contact both the insulator and the second conductivity type regions of the substrate. Preferably the deposition of the electronically conductive glass is accomplished by R.F. diode sputtering in an atmosphere selected to produce a desired resistivity in the glass, e.g., sputtering in an argon atmosphere has a negligible effect on resistivity while sputtering in an oxygen or nitrogen containing atmosphere produces an increase and decrease, respectively, in the resistivity of the deposited glass.

Figure 2:
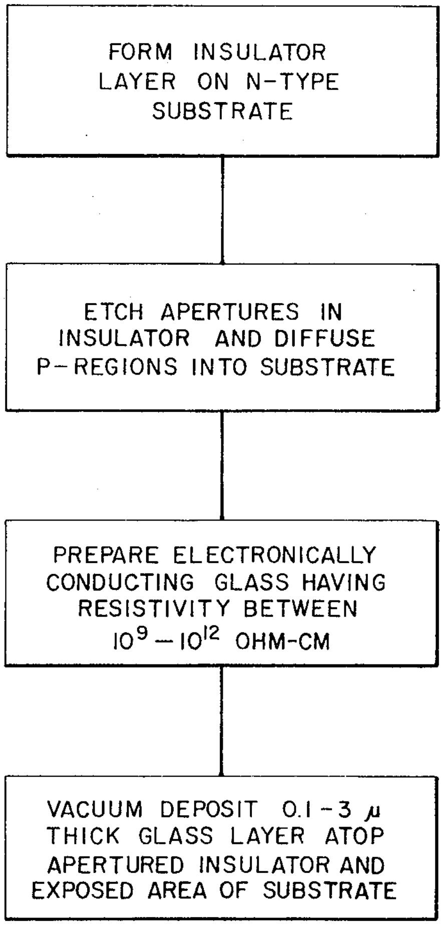
Figure 3:
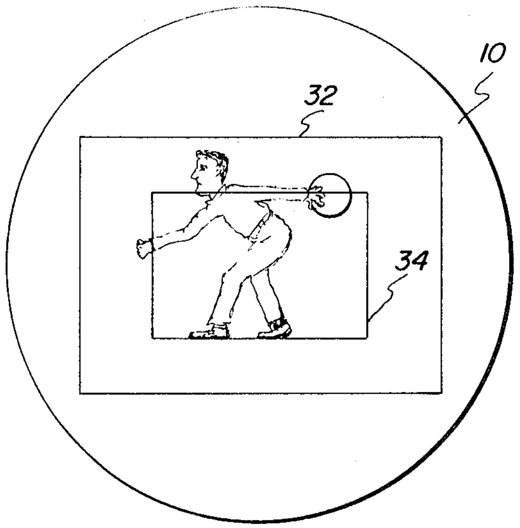
Figure 4:
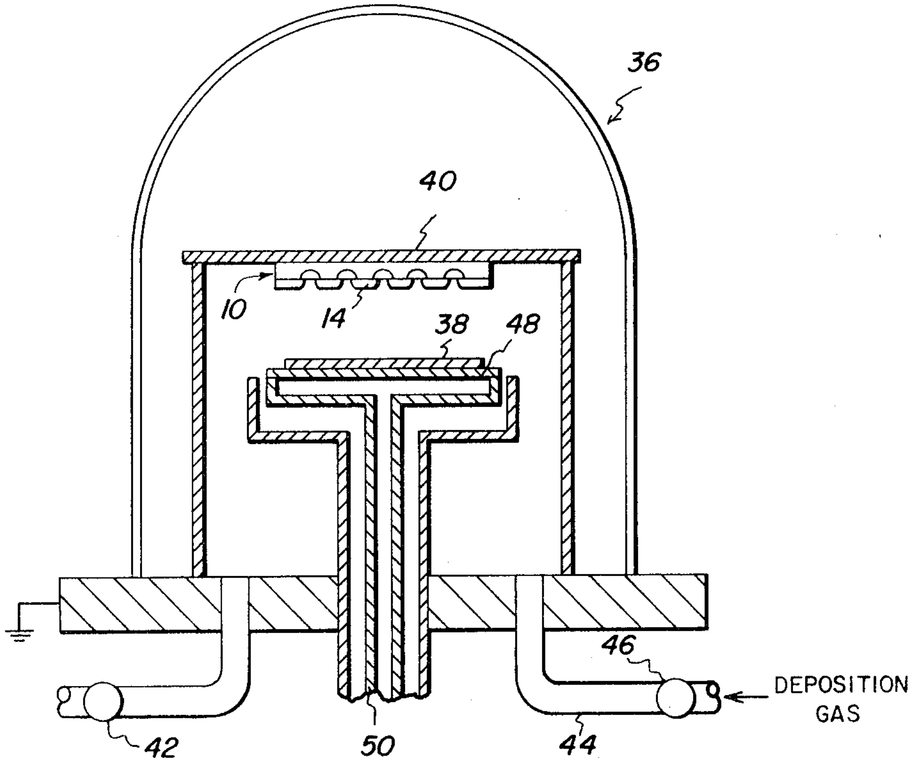

The novel features believed characteristic of the invention are set forth in the appended claims. The invention itself, together with further objects and advantages thereof may best be understood by reference to the following description, taken in connection with the accompanying drawings, in which:

FIG. 1 is a sectional view of a diode array camera tube target constructed in accordance with this invention, FIG. 2 is a flow chart illustrating in block diagram form the preferred method of fabricating camera tube targets of this invention, FIG. 3 is a plan view of a diode array target illustrating the burn-in problem associated therewith, and FIG. 4 is a simplified sectional view of an R.F. sputtering chamber suitable for the forming diode array target of FIG. 1.

A specific embodiment of a diode array camera tube target 10 in accordance with this invention is depicted in FIG. 1 and generally includes a thin, e.g., less than 10-mil thick, N-type silicon substrate 12 having approximately 5,000 A thick oxide surface layers 14 and 16 thermally grown atop the major faces of the substrate. Oxide layer 14, disposed proximate a scanning electron beam illustrated by arrows 18 during operation, is photoetched in accordance with the preparatory technique of FIG. 2 to form a multitude, e.g., $10^6$ per sq. inch, of apertures 20 in the oxide layer and a suitable dopant, such as boron, is diffused through apertures 20 into the silicon wafer in conventional fashion, e.g., from a boron doped glass, to form discrete P-regions 22 in the N-type substrate. During diffusion of the boron into substrate 12, the boron also diffuses laterally to extend the P-regions under oxide layer 14 to insure a complete shielding of the N-type region of the substrate from electron beam 18 during scanning. A 0.1–3 micron thick electronically conductive glass then is deposited as a homogeneous layer 24 atop apertured oxide layer 14 and a portion of the glass layer extends into apertures 20 to electrically contact P-regions 22 to permit charge to drain from the oxide layer to a adjacent P-regions of the target. Typically, the face of substrate 12 remote from the electron beam is provided with a light transparent, e.g., 200 A thick, metallic electrode 26 positively biased relative to the electron beam generating cathode (not shown) through lead 27 to increase the discharge rate of the diodes forming the target upon light impingement thereon.

In operation, an electron beam of a diameter encompassing a plurality of P-regions 22 is scanned across glass layer 24 and the electrons penetrate into the unshielded P-regions to reverse bias the individual diodes formed by each P-region in the N-type substrate. Because the dark current of the diodes is negligible during the interval between identical scan patterns, a subsequent scan of the diodes by the electron beam requires only a relatively small deposited electron charge to restore the diode to a reverse biased condition. In an area of the substrate surface whereat light rays 28 impinge to produce hole-electron pairs, the adjacent diodes require a greater electron charge during a subsequent scan to be restored to a reverse biased condition and the electron charge absorbed at diverse locations along the target is measured by resistor 30 connected to silicon substrate 12 to provide an output video signal from the target.

Because the electronically conductive glass employed to remove the electron beam induced charge on oxide layer 14 is highly resistant to electron beam deterioration, the diode array target of FIG. 1 is especially adaptable for operation in the zoom type mode illustrated in FIG. 3. Thus for an encompassing view of a given scene, the area of target 10 lying within rectangle 32 would be scanned by the electron beam while a zoom effect to magnify specific portions of the scene is achieved by reducing the scan area, e.g., by diminishing the amplitude of the deflection signals applied to magnetic deflection coils circumferentially disposed about the electron beam, to traverse only those diodes lying within rectangular area 34. Because glass layer 24 is burn-in free, upon subsequent enlargement of the target scan area to encompass those diodes lying between rectangular areas 32 and 34, no noticeable difference in the amplitude of the signal generated across resistor 30 is observed resulting from enlargement of the scanned target area.

The glass employed to drain charge from oxide layer 14 to P-regions 22 generally can be any electronically conductive glass having a resistivity between $10^8$ and $10^{16}$ ohm-cm with a glass having a resistivity between $10^9$–$10^{12}$ ohm-cm being optimum for discharging silicon dioxide insulators within the one-thirtieth of a second between conventional T.V. frames. Preferably the electronically conductive glass is one of the borate glasses described in U.S. Pat. No. 3,258,434, issued to J.D. Mackenzie et al. on June 28, 1966 and assigned to the assignee of the present invention (the disclosure of which patent is incorporated herein). These borate glasses generally are characterized by 20–40 mole percent of an alkaline earth metal oxide and at least 15 mole percent of an oxide of a metal selected from the group consisting of chromium, iron, antimony, vanadium, titanium, nickel, cobalt, manganese, molybdenum, tungsten, arsenic, and mixtures thereof. Each of the metal oxides in the latter group provide in the glass metal ions of higher valence state and lower valence state in a ratio of from equal parts to four parts to one part dependent upon both the materials and fabrication techniques employed to fabricate the glass.

A particularly suitable glass for the practice of this invention is a calcium borate ($CaO \cdot 2B_2O_3$) glass with additives of iron oxide and/or vanadium oxide in a suitable proportion to produce the desired resistivity in the glass. During smelting of the glass, both the iron and vanadium oxides form metal ions having a higher valence state, e.g., $V^{+++}$ and $Fe^{+++}$, and a lower valence state, e.g., $V^{++}$ and $Fe^{++}$, with the ratio of the two states being controllable by a variation in the percentage of ion forming oxides in the glass. Even for borate glasses of identical composition, the ratio of higher valence ions to lower valence ions can be regulated by the procedure employed for forming the melt. For example, a base glass of calcium borate ($CaO \cdot 2B_2O_3$) doped with 6.25 mole percent $Fe_3O_4$ on the basis of the $CaO \cdot 2B_2O_3$ content and prepared by fusing the materials in an open platinum crucible at 125° C was found to have a $Fe^{++}$ to $Fe^{+++}$ ratio which could be adjusted to reduce the resistivity of the bulk glass by bubbling hydrogen (or a gaseous mixture of equal parts hydrogen and nitrogen) through the glass melt. Similarly, the resistivity of the borate glasses have been increased by bubbling an oxygen containing gas, e.g., air, through the melt. Because of the tendency of oxygen to increase the resistivity of the borate glasses, the glass melt normally is covered with a bed of inert molecular nitrogen gas during smelting when an increased resistivity in the glass is not desired. Thus the resistivity of the bulk glass forming layer 24 can be varied by altering either the percentages of the component compounds in the glass or the degree of oxidation of the melt during processing.

To inhibit crazing of glass layer 24 when deposited atop the silicon substrate, the glass layer must be deposited to a thickness less than 3 microns atop the wafer using suitable apparatus such as the conventional R.F. diode sputtering chamber 36 depicted in simplified form in FIG. 4. A glass composition having a resistivity between $10^9$ and $10^{12}$ ohm-cm, for example the borate glass composition heretofore described, is positioned as the target 38 within the chamber while the silicon substrate is disposed upon substrate holder 40 with apertured oxide layer 14 in a confronting attitude relative to the target. After the chamber is sealed and evacuated to below $10^{-6}$ torr by vacuum pump 42, a suitable deposition gas such as argon is introduced into the chamber through conduit 44 and variable leak valve 46 to produce a flowing gas pressure between 1 and 100 microns argon within the chamber whereupon electrode 48 holding target 38 is energized with suitable R.F. power, e.g., 45 watts, through cable 50 to produce an R.F. discharge within chamber 36. Argon ions formed by the R.F. discharge impinge upon the glass target to sputter molecules therefrom and sputtering is continued until a 0.1–3 micron thick glass layer is deposited atop the silicon substrate.

When the gaseous atmosphere within the sputtering chamber is entirely inert, e.g., pure argon, the resistivity of the deposited conductive glass layer is equal to the resistivity of the bulk glass employed as the target. The resistivity of the deposited glass layer however also can be increased or decreased by the inclusion of oxygen or hydrogen, respectively, within the sputtering atmosphere to alter the concentration of higher and lower valence ions within the deposited conductive glass layer relative to the bulk target glass. Surprisingly, when nitrogen, the inert gas employed as a blanket and/or hydrogen dilutent during the fabrication of the bulk glass, is present in the deposition chamber in quantities in excess of 2 percent by volume, the resistivity of the deposited glass layer is found to be decreased relative to the resistivity of the bulk target glass.

When glass layer 24 is put down atop substrate 12 by techniques other than by R.F. sputter deposition to a thickness greater than 3 microns, the glass has been found to craze negating its utilization as a conductive medium for draining charge from oxide layer 14. For example, when a 5 micron thick layer of calcium borate glass ($CaO \cdot 2B_2O_3$) with additives of iron oxide ($Fe_3O_4$) and vanadium oxide ($V_3O_4$) was bonded to a silicon dioxide layer atop a silicon substrate by heating the glass atop the substrate at 600° C in vacuum, the glass layer was found to be craze distorting the electronic conductive characteristics of the glass and negating use of the vacuum bonded glass to drain charge from an apertured insulator.

Although the diode array target of this invention preferably utilizes the alkaline earth metal borate glasses described in U.S. Pat. No. 3,258,434, other electronically conductive glasses, e.g., the mangano-silicate glasses described in U.S. Pat. No. 3,093,598 and the silica-free lithium borate glasses described in U.S. Pat. No. 3,061,752 also can be employed to form glass layers for diode arrays in accordance with this invention.

After coating the silicon substrate with an electronically conducting glass to form the diode array target of this invention, the target can be sealed in a standard vidicon tube to permit electron beam irradiation of the glass coated target face. Preferably, the tube and target are baked out at a temperature in excess of 100° C, e.g., preferably between 200° C and 300° C, in vacuum prior to sealing to enhance the operative life of the target.

A more complete understanding of this invention can be obtained from the following example of the fabrication of a specific diode array target.

A polished and etched 200 microns thick (100) silicon wafer doped with phosphorus to an N-type resistivity of 10 ohm-cm thermally oxidized to form a 0.5 micron thick surface layer whereupon 8 micron diameter holes on 15 micron centers were etched through the oxide layer upon one face of the wafer using buffered hydrofluoric acid and standard photomasking techniques. After boron was vapor diffused into the silicon wafer through the etched holes in the oxide to form a plurality of P-doped areas in the silicon wafer, the oxide layer on the face of the wafer opposite the apertured oxide was removed and phosphorus was diffused into the completely exposed face to form an $N^+$ surface therein.

An electronically conductive glass cast as a 5-inch diameter ¼-inch thick disc and composed of 51 mole percent $CaO \cdot 2B_2O_3$, 9 mole percent $Fe_3O_4$ and 40 mole percent $V_2O_5$ then was placed atop a shielded electrode in an R.F. diode sputtering chamber. After the prepared silicon wafer was positioned approximately one inch above the glass disc source with the apertured oxide face of the wafer in a confronting attitude relative to the glass disc, the chamber was evacuated to about $10^{-6}$ torr whereupon pure argon was leaked into the chamber to produce a pressure equilibrium at about $6 \times 10^{-3}$ torr. Upon subsequent energization of the electrode holding the glass disc with a 13.56 megahertz signal through a suitable impedance matching circuit, a glow discharge was established within the chamber and the discharge was maintained for about 100 minutes with a net R.F. power input of 90 watts to R.F. sputter deposit a 0.25 micron thick glass layer atop the wafer face having the apertured oxide coating thereon. The resistivity of the glass layer as deposited measured approximately $10^9$ ohm-cm.

When the wafer subsequently was sealed into a standard vidicon tube and the glass coated face irradiated with a scanned electron beam, the glass layer was found to leak charge from the apertured oxide layer on the silicon wafer at a rate sufficient to inhibit inordinate charge build-up on the oxide layer.

What we claim as new and desire to secure by Letters Patent of the United States is:

1. A method of forming a camera tube target comprising preparing a silicon semiconductive wafer of first conductivity type, forming an insulating layer atop one face of said silicon wafer, etching a plurality of apertures through said insulating layer, diffusing an impurity through said apertures to form regions of a second conductivity type extending partially into said wafer, and vacuum depositing a layer of electronically conductive glass having a resistivity between $10^8$ and $10^{16}$ ohm-cm atop said one face of said wafer to contact both said insulating layer and said second conductivity regions with said electronically conductive glass.

2. A method of forming a camera tube target according to claim 1 wherein said glass is deposited to a thickness between 0.1 and 3 microns by R.F. sputtering.

3. A method of forming a camera tube target according to claim 2 wherein said R.F. sputtering is conducted in an inert gaseous atmosphere at a pressure between 1 and 100 microns.

4. A method of forming a camera tube target according to claim 2 wherein said R.F. sputtering is conducted at a pressure of 1 to 100 microns in an atmosphere containing an oxidizing gas.

5. A method of forming a camera tube target according to claim 2 wherein said R.F. sputtering is conducted at a pressure of 1 to 100 microns in an atmosphere containing a reducing gas.

6. A method of forming a camera tube target according to claim 2 wherein said R.F. sputtering is conducted in an atmosphere containing in excess of 2 percent by volume nitrogen.

* * * * *